J. F. FOX.
LUBRICATING DEVICE FOR MINE CAR WHEELS.
APPLICATION FILED JUNE 8, 1918.
1,357,972.
Patented Nov. 9, 1920.
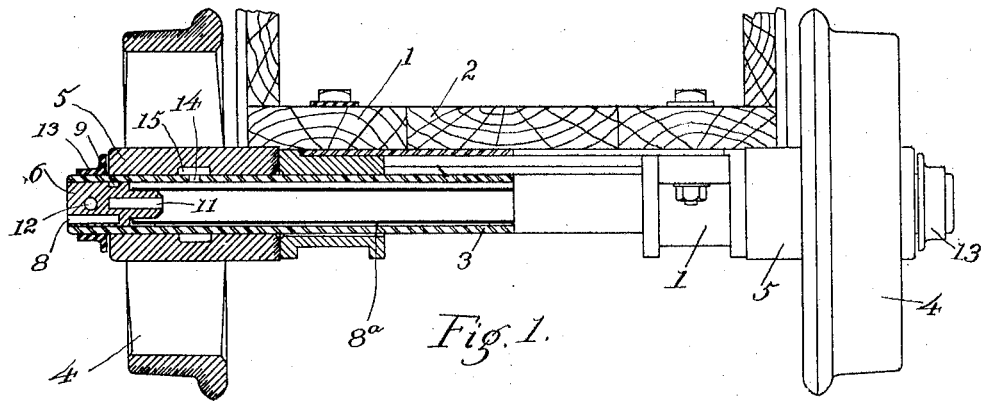
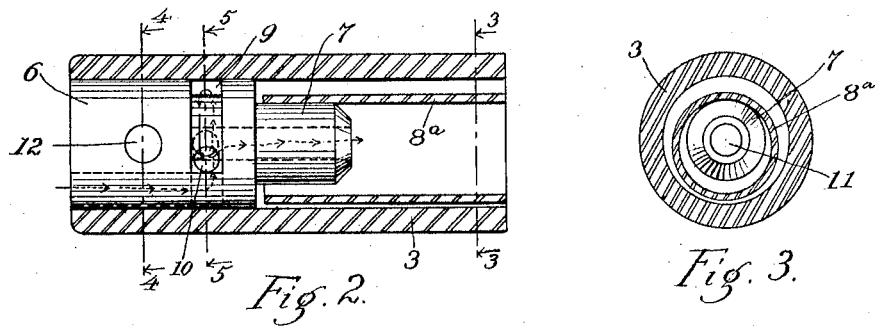
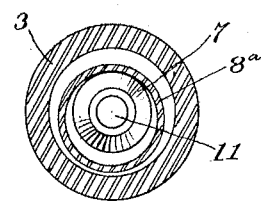
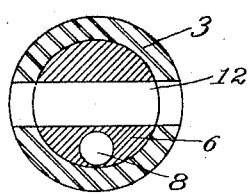
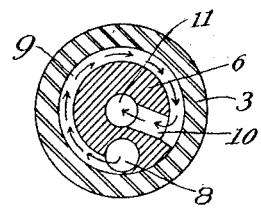
Inventor:
John F. Fox
By Allen & Allen
Attys.

UNITED STATES PATENT OFFICE.

JOHN F. FOX, OF BIRMINGHAM, ALABAMA, ASSIGNOR TO SOUTHERN WHEEL COMPANY, OF ST. LOUIS, MISSOURI, A CORPORATION OF GEORGIA.

LUBRICATING DEVICE FOR MINE-CAR WHEELS.

1,357,972.    Specification of Letters Patent.    Patented Nov. 9, 1920.

Application filed June 8, 1918. Serial No. 238,978.

*To all whom it may concern:*

Be it known that I, JOHN F. Fox, a citizen of the United States, and a resident of Birmingham, in the county of Jefferson and State of Alabama, have invented certain new and useful Improvements in Lubricating Devices for Mine-Car Wheels, of which the following is a full, clear, and exact description, reference being had to the accompanying drawing, forming part of this specification.

For the lubrication of vehicle wheels and especially of wheels for mine cars which are subject to unusual wear and in which proper lubrication is very apt to be neglected, it has been customary to provide hollow axles which periodically are to be filled with grease which finds its way to the hubs on the wheels in the various ways. There has always been considerable difficulty in filling the axles and in providing proper closure for the hollow axles to prevent escape and loss of the lubricant.

It is the object of my present invention to provide a simple, cheap and effective means to permit ready filling of the axle and to prevent the escape of the grease without the necessity of any valve or screwthreaded plug to close the grease supply opening, and in which a free and open air passage is provided for the hollow axle to allow a free flow of the lubricant from end to end of the axle without air resistance.

My object is accomplished by the construction of plugs for the ends of the axle to be hereinafter particularly pointed out and claimed, in which the passageways therethrough are so arranged that while remaining open for forcing the lubricant into the axle, the oil cannot leak therefrom, regardless of the position of the plug in the operation of the car.

In the drawing,

Figure 1 is a view, half in section and half in elevation of the wheels and hollow axle.

Fig. 2 is a longitudinal section of the axle showing the plug in elevation.

Fig. 3 is a cross section of the axle, taken on the line 3, 3, of Fig. 2.

Fig. 4 is a similar section, taken on the line 4, 4, of Fig. 2.

Fig. 5 is a cross section on the line 5, 5, of Fig. 2.

Mounted on suitable boxes 1, 1, on the car body 2, is the hollow axle 3. Wheels 4, 4, having hubs 5, 5, are mounted on the ends of this axle, so as to revolve thereon. For closing the ends of the axle, I provide plugs 6, one for each end. The plug for its body portion is turned so as to fit snugly into the axle and adapted to be driven into the axle ends to form a tight end closure. The inner end of the plug is provided with an inwardly projecting nose 7 of considerably smaller diameter than the body of the plug, and this nose at each end is intended to support loosely an inner tube $8^a$ which acts as a retarder to the flow of grease from the axle into the hubs of the wheels. The body of the plug is provided with a hole 8 extending lengthwise into a transverse groove 9 which extends around the periphery of the plug to within a short distance from the inner end of the hole 8 but does not extend to the hole. From this point there is a radial passageway 10 opening into a central hole 11, which is extended lengthwise through the nose 7 and opening into the retarding tube $8^a$.

Drilled through the axle and the body of the plug so as to clear the hole 8 is the cotter pin hole 12 for the reception of a cotter pin, and 13, 13, are washers mounted on the outside of the axle which act as hub-retaining washers through which the cotter pin also passes. There is some space allowed between these washers and the ends of the hubs of the wheels so that there will be some longitudinal play for the wheels on the axle. For filling the axle with grease, a grease gun is used, and the grease is forced in through the opening 8 through the groove 9, passageway 10 and central opening 11 until the hollow spaces inside the axle are filled. No closure for the hole 8 is required, because it will be evident that the oil in the axle cannot flow out through the plug, no matter what position the oil hole in the plug may happen to occupy, whether on the top or side or bottom. In order to flow out through the openings through which the oil is forced into the axle, it would have to pass up around the plug through the transverse peripheral groove 9, so that the axle can be filled with oil to within a quarter of an inch of the top without any leakage.

Another advantage from having a constant opening into the axle at either end which is not closed by any plug for the oil hole, is that the air pressure always remains constant and there is no chance of a formation of a partial vacuum, or the formation of air pockets to resist the free passage of the lubricant to the hubs through the wheels. The lubricant is fed automatically to the hubs through the openings 14 spaced around the axle and discharged into annular grooves 15 in the hubs of the wheels, which grooves are considerably wider than the holes 14, so that whatever the position of the wheel due to endwise play, there will be communication between the axle and the bearing surface of the wheel. The cotter pin hole 12, it will be noticed, has no communication whatever with the oil supply passages, so there is no chance of leakage through this opening.

Having thus described my invention, what I claim as new and desire to secure by Letters Patent, is:—

1. In a running gear for cars, a hollow axle for grease, with plugs to fit into and close the ends of the axle, the plugs being provided with a transverse peripheral passageway intermediate the ends of the plug, with one end of the peripheral openings in communication with an opening through the outer end of the plug, and the other end communicating with an opening through the inner end of the plug, whereby free communication may be had through the plug without the leakage of grease therethrough.

2. In a running gear for cars, a hollow axle for grease, with plugs to fit into and close the ends of the axle, the plugs being provided with a transverse peripheral passageway intermediate the ends of the plug, with one end of the peripheral opening in communication with an opening through the outer end of the plug, and the other end communicating with an opening through the inner end of the plug, whereby free communication may be had through the plug without the leakage of grease therethrough, and a transverse cotter pin hole through the axle and plug free from the grease passageway.

3. In a running gear for cars, a hollow axle for grease, with plugs to fit into and close the ends of the axle, the plugs being provided with a transverse peripheral passageway intermediate the ends of the plug with one end of the peripheral opening in communication with an opening through the outer end of the plug substantially at the outer cylindrical surface of the plug, and the other end communicating with an opening through the inner end of the plug at the central portion thereof, whereby free communication may be had through the plug without the leakage of grease therethrough.

4. In a running gear for cars, a hollow axle for grease, with plugs to fit into and close the ends of the axle, wheels loosely mounted on the axle, with washers to retain same, the plug, axle and washer being provided with cotter pin holes in alinement for the reception of cotter pins, and the plug also provided with a longitudinal passageway between the cotter pin hole and the cylindrical surface of the plug opening into an annular opening extending partially around the plug in a plane at right angles to the longitudinal passage and thence opening into a central passage extending through the plug on the inside, for the purpose described.

5. In a running gear for cars, a hollow axle for grease, with plugs to fit into and close the ends of the axle, the plug and axle being provided with a cotter pin hole for the reception of a pin to secure the car wheel in place, said plug having an opening lengthwise therethrough clear of the cotter pin hole for supplying the hollow axle with grease, the grease opening extending from the lower to the upper side of the plug to prevent leakage from the hollow axle without closing the grease opening.

JOHN F. FOX.